(12) United States Patent
Indihar

(10) Patent No.: US 6,650,126 B1
(45) Date of Patent: Nov. 18, 2003

(54) ELECTRICAL SENSOR FOR MEASURING CAPACITANCE CHANGE AND CONVERSION INTO A VOLTAGE SIGNAL

(76) Inventor: Maximilian Indihar, Freinsheimer Strasse 3, D-68210 Mannheim (DE)

( * ) Notice: Subject to any disclaimer, the term of this patent is extended or adjusted under 35 U.S.C. 154(b) by 103 days.

(21) Appl. No.: 10/030,401
(22) PCT Filed: Jul. 10, 2000
(86) PCT No.: PCT/DE00/02249
§ 371 (c)(1),
(2), (4) Date: Jan. 7, 2002
(87) PCT Pub. No.: WO01/04578
PCT Pub. Date: Jan. 18, 2001

(30) Foreign Application Priority Data

Jul. 13, 1999 (DE) .......................... 199 32 162

(51) Int. Cl.[7] .............................. G01R 27/26
(52) U.S. Cl. ..................... 324/658; 324/686
(58) Field of Search .................. 324/658, 661–663, 324/686, 688, 671, 675, 654, 655, 127; 340/426.1, 435; 361/179–181

(56) References Cited

U.S. PATENT DOCUMENTS

| | | | | |
|---|---|---|---|---|
| 3,990,005 A | * | 11/1976 | Abbe et al. | 324/662 |
| 4,661,797 A | * | 4/1987 | Schmall | 340/561 |
| 5,394,292 A | * | 2/1995 | Hayashida | 361/179 |

FOREIGN PATENT DOCUMENTS

| | | |
|---|---|---|
| DE | 34 08 261 | 8/1989 |
| DE | 40 06 119 | 8/1991 |
| DE | 44 33 677.2 | 3/1995 |
| EP | 0 344 942 | 12/1989 |
| EP | 0 564 164 | 10/1993 |

* cited by examiner

Primary Examiner—Jay Patidar
Assistant Examiner—Amy He
(74) Attorney, Agent, or Firm—Collard & Roe, P.C.

(57) ABSTRACT

The invention relates to an electrical sensor for measuring capacitance change of a capacitor and for conversion into a voltage signal (Udiff) corresponding to the capacitance change. The voltage signal is sent to a display device or measuring device and evaluated using a transformer having two double-would coils (La, Lb) on a core. The capacitance change generates a differential current in a tertiary coil (Lc), which is evaluated in the display or measuring device.

14 Claims, 4 Drawing Sheets

Figure 1:
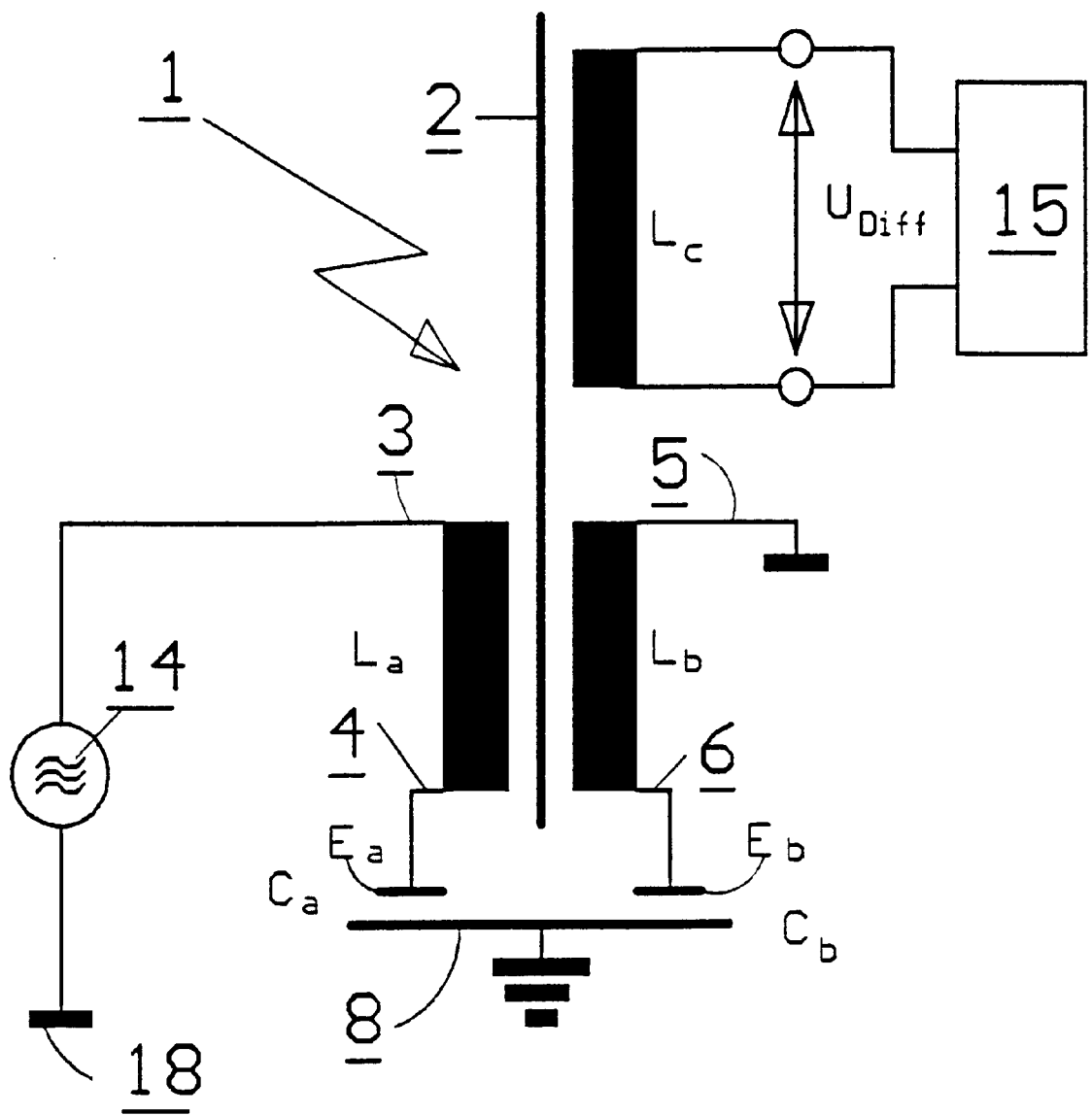

ELECTRICAL SENSOR FOR MEASURING CAPACITANCE CHANGE AND CONVERSION INTO A VOLTAGE SIGNAL

CROSS REFERENCE TO RELATED APPLICATIONS

Applicant claims priority under 35 U.S.C. §119 of German Application No. 199 32 162.0 filed Jul. 13, 1999. Applicant also claims priority under 35 U.S.C. §120 of PCT/DE 00/02249 filed Jul. 10, 2000. The international application under PCT article 21(2) was not published in English.

TECHNICAL AREA

The invention relates to an electric sensor for measuring a capacitance change of a condenser and conversion into a voltage signal that corresponds to the capacitance change and that is transmitted to a display or measuring device and evaluated using a transformer with two bifilarly wound coils on a core, whereby a signal generator is connected to the input of the primary coil, especially for reporting a distance change of an object to be detected or to be monitored or to report the movement of two objects moving relative to each other, according to the generic part of claim 1 as well as its use according to claim 12.

STATE OF THE ART

A number of electric sensors that function on a capacitive or inductive basis are known, and they normally contain an initiator that works contact-free and touch-free, and that has a high-frequency oscillator in a blocking oscillator circuit with an active LC or RC oscillating circuit. If an LC initiator is involved, then the inductivity of the LC oscillating circuit is configured as a coil with a directional high-frequency field. If an electrically conductive medium is placed into the field, then an attenuation in the oscillating circuit occurs. If the attenuation is sufficiently large relative to the distance from the medium to the coil of the LC oscillating circuit, then the oscillation of the oscillator is interrupted, whereby this state change is converted into a switching command in an evaluator. If an RC initiator is involved, then the sensor electrode is part of the condenser of the RC oscillating circuit whose capacitance is capable of changing when an object with an adequately high relative permittivity approaches the sensor electrode, as a result of which the RC oscillating circuit is excited so as to oscillate or the oscillations are interrupted and the change in the oscillation amplitude can be evaluated in a downstream envelope demodulator. Switches with such sensors have the property that the switching distance depends on the material properties and on the consistency of the object to be detected. Thus, the change in the capacitance of an active surface causes a change in the frequency, which can be evaluated.

EP 0,344,942 B1 describes a transformer-coupled capacitance measuring arrangement with an electrode (FIG. 8 there) that allows a direct measurement of capacitances against ground involving the use of a bifilar transformer, whereby an oscillator with a constantly controlled amplitude is connected to the input of the primary coil. The outputs of the primary and secondary coils are connected with a virtual ground so that the inputs of the coils move in unison. The input of the secondary coil is connected to an electrode via which shielding takes place. Through the stabilization of the amplitude of the oscillator, it is achieved that a constant dielectric current flows from the electrode to the ground. The current that is established in the secondary coil and that flows into the virtual ground is then a measure of the distance h of the electrode from the ground, since the impedance of the electrode to the ground is proportional to the distance h.

DE 3,408,261 A1 describes an approximation switch in which long-time averaging of the receiver signal takes place. The approximation switch has a transmitter and a receiver to receive the radiation emitted by the transmitter and reflected from an object. A long-time averaging element forms a long-time average of the received signal, which is compared to a comparator signal. The comparator signal is a short-time signal that represents the momentary value of the received signal, compares it to the long-time signal, whereby a comparator signal is emitted when the deviation of the short-time signal from the long-time signal exceeds a certain value. In a parallel-resonant circuit, the new long-time averaging by the long-time averaging element is suppressed during the time in which an output signal of the comparator is present, which is used to form the output signal of the switching arrangement.

Moreover, DE 4,433,677.2 describes a process for monitoring a moving medium, especially for measuring the filling level in a container or for reporting the distance of an object to be detected, using a capacitive electric sensor that is downstream from a charging pump in a feedback loop and that comprises a Schmitt trigger and a comparator, to each of whose inputs the output signal of the sensor is connected. The output of the comparator forms the feedback loop to which—after a supply voltage or supply current source—the contact-break distance of a switch is connected that is actuated by the output of the Schmitt trigger, whereby the output signal is likewise picked up at the output of the Schmitt trigger.

Such sensors generally have the drawback that, due to the temperature-dependence of the sensor, no uniform sensitivity is ensured. As a result, once the sensor has been adjusted, the switching distance might be altered or else the oscillator might start to oscillate even before an object or medium is located in the response area; as a result, the switching distance is not constant over the temperature range. By the same token, an application-specific adjustment of the sensor can become necessary outside of the specifications of the sensor, which can be extremely difficult to implement. Moreover, such sensors are highly direction-dependent, which is often disadvantageous. Likewise, such sensors have the drawback that the capacitance of the active surface depends to a great extent on the environment and on its changes.

TECHNICAL TASK

The invention is based on the objective of creating an electric sensor of the type described above with which two objects moving relative to each other can be located capacitively, especially also large-surface objects, and thus objects such as pictures in an art gallery can be protected against theft.

DISCLOSURE OF THE INVENTION AND ITS ADVANTAGES

The objective is achieved according to the invention by the following features:

a) each one of the two condenser electrodes of the condenser is connected to the outputs of the primary and secondary coils, whereby said electrodes form an electric field between them and there is a shared reference electrode across from them which, for each of the condenser electrodes, additionally forms an electric stray field, so that each condenser electrode yields a stray field condenser with the reference electrode, b) the input of the secondary coil is connected to a fixed system reference potential, c) on the core of the transformer, there is a tertiary coil to which the display or measuring device is connected, d) an object approaching the condenser electrodes and the reference electrode brings about a change in the capacitance of the stray field condensers relative to the reference electrode, whereby this capacitance change generates a differential mode voltage in the tertiary coil and this voltage is evaluated in the display or measuring device.

Preferably, the signal generator is an oscillator or a pulse generator with a fixed working point, namely, in terms of amplitude and/or frequency and/or signal shape, for example, a rectangular-wave generator or a burst generator.

The advantage of the invention is that the sensor can detect very small signals, whereby the interfering signal is several times larger than the useful signal. With the invention, it is possible to still reliably detect an interfering signal-to-useful signal ratio of 2000:1 and better. With the use of a differential transformer, the measuring process is practically impervious to the interferences of the environment, since both condenser electrodes (Ea, Eb) are equally exposed to interferences; the measuring process allows a statistical detection of the change in the electric stray field at the active electrode, that is to say, the one that is connected at the output of the primary coil to the reference electrode.

The principle of the invention is based on the fact that a fixed defined output signal of a signal generator, for example, a rectangular signal of a rectangular-wave generator, is fed into the primary coil of the transformer or of the differential transformer, whereby each one of the two condenser electrodes of a condenser, which constitutes the active electrode, is connected to the other end of the primary coil. One end of the winding of the secondary coil—both coils are wound bifilarly onto a shared core—is connected to the second condenser electrode of the condenser, which constitutes the counter-electrode of the condenser; the other end of the secondary coil is connected to a fixed reference potential, preferably system ground. The two condenser electrodes are at a small and constant distance from each other and form an electric field between them, for example, a plate condenser. Across from the two condenser electrodes is a third electrode as the reference electrode, which is preferably the ground and which likewise constitutes a condenser electrode. Between each of the two condenser electrodes and the third reference electrode, an electric field is likewise formed, namely, a stray field, whereby the stray field formed between the active condenser electrode and the ground or these stray fields is/are changed or disrupted as soon as an object enters or leaves the detection area. The change in this stray field or in these stray fields when an object approaches or moves away—the change of the two stray capacitances (Ca and Cb) or the change of the ratio thereof (Ca:Cb)—brings about a current change in the differential transformer that can be evaluated in a display or measuring device connected to the tertiary coil. In an advantageous manner, only the differential transformer serves as one single component for feeding in and picking up the capacitance values and amplifying the output signal.

The system reference potential or system ground and the reference potential of the reference electrode, preferably ground, do not have to have the same potentials in the invention; the system reference potential or system ground and the reference potential of the reference electrode, like the ground, do not have to be identical.

On the basis of the bifilar winding of the two bifilar coils of the differential transformer, the two currents are subtracted with respect to each other when the device is at rest, so that very little or no differential voltage is induced in the tertiary coil. The two condenser electrodes, together with the reference electrode, constitute the actual capacitance sensor.

If the ratio of the electric stray fields between the two condenser electrodes and the third reference electrode changes, for example, due to an object that approaches or moves away from the condenser electrodes, then the capacitance ratios change. In doing so, a change of the capacitance of the active condenser electrode, which is connected to the primary coil, brings about a change in the current in the primary coil. The current in the secondary coil, however, remains practically unchanged since the electric field between the electrodes is only negligibly changed. As a consequence, a change occurs in the currents of the primary and secondary coil that are subtracted with respect to each other, which change in the tertiary coil results in the induction of a relatively large differential voltage that can be displayed and evaluated in a display and measuring device. This embodiment makes the entire circuit practically impervious to environmental influences, since environmental influences are exerted equally on both stray fields towards the reference electrode. This also means that neither the distance of the condenser electrodes nor the electrode surfaces nor the dielectric of the condenser electrodes are changed for purposes of the measurement but rather, only the stray field is disrupted by an object approaching or moving away, which causes a capacitance between the ground and the measuring arrangement.

Moreover, the condenser electrode, the active electrode, which is connected to the primary coil, can have a structure that is provided with interruptions and that does not have a full surface. Then, when a liquid is sprayed or poured, the condenser surface changes which, in turn, brings about a voltage change in the tertiary coil. For this purpose, the condenser electrode, which is connected to the primary coil, can be a grid or a net or else it can consist of cohesive strips.

The winding ratio of the primary coil to the secondary coil is preferably 1 to 1; the winding ratio of the tertiary coil to the primary or secondary coil is preferably between 1 and 2000 to 1. The winding ratio is preferably adapted to the size ratio of the electrodes with respect to each other. The display or measuring device has an optical or acoustic display element.

The two condenser electrodes are arranged as flat electrodes that lie or stand across from each other and they can be slanted at a prescribed angle, preferably 90 degrees, with respect to the reference electrode.

The device also has the advantage that slowly changing disturbance variables such as temperature, humidity and/or dust do not have an effect. In particular, the device is practically not dependent on the temperature.

In particular, the use of the invention to protect an object against theft or destruction or to report the presence or the absence of an object, such as a picture or a sculpture or a vehicle in a parking spot, can be characterized in that the condenser electrode, which is connected to the primary coil, is placed behind the picture or under the sculpture or else behind or under the vehicle so that, when a person or an object approaches the picture or the sculpture or the parking spot and comes closer than a predefined safety distance, the change in the electric field between the ground and the active electrode, which is detected by the capacitive sensor, brings about a voltage change in the tertiary coil that can be evaluated in the display or measuring device.

The actual capacitive sensor or the safety means can be configured in such a way that a carrier representing a dielectric is situated in the area of a vehicle parking spot, the active condenser electrode Ea is arranged on the side facing the vehicle and the second condenser electrode Eb is situated on the opposite side of the carrier, whereby the load-bearing surface for the vehicle is the reference electrode, namely, the ground.

A plurality of capacitive sensor electrodes, each consisting of the two condenser electrodes as well as the reference electrode, can be actuated by means of a multiplexer and can then be evaluated consecutively. As a result, considerable cost savings are achieved since only a differential transmission module of the transformer is needed. The fixed system reference potential, to which the tertiary coil is connected, can be the ground or the system ground.

BRIEF DESCRIPTION OF THE DRAWING IN WHICH THE FOLLOWING IS SHOWN

Figure 2:
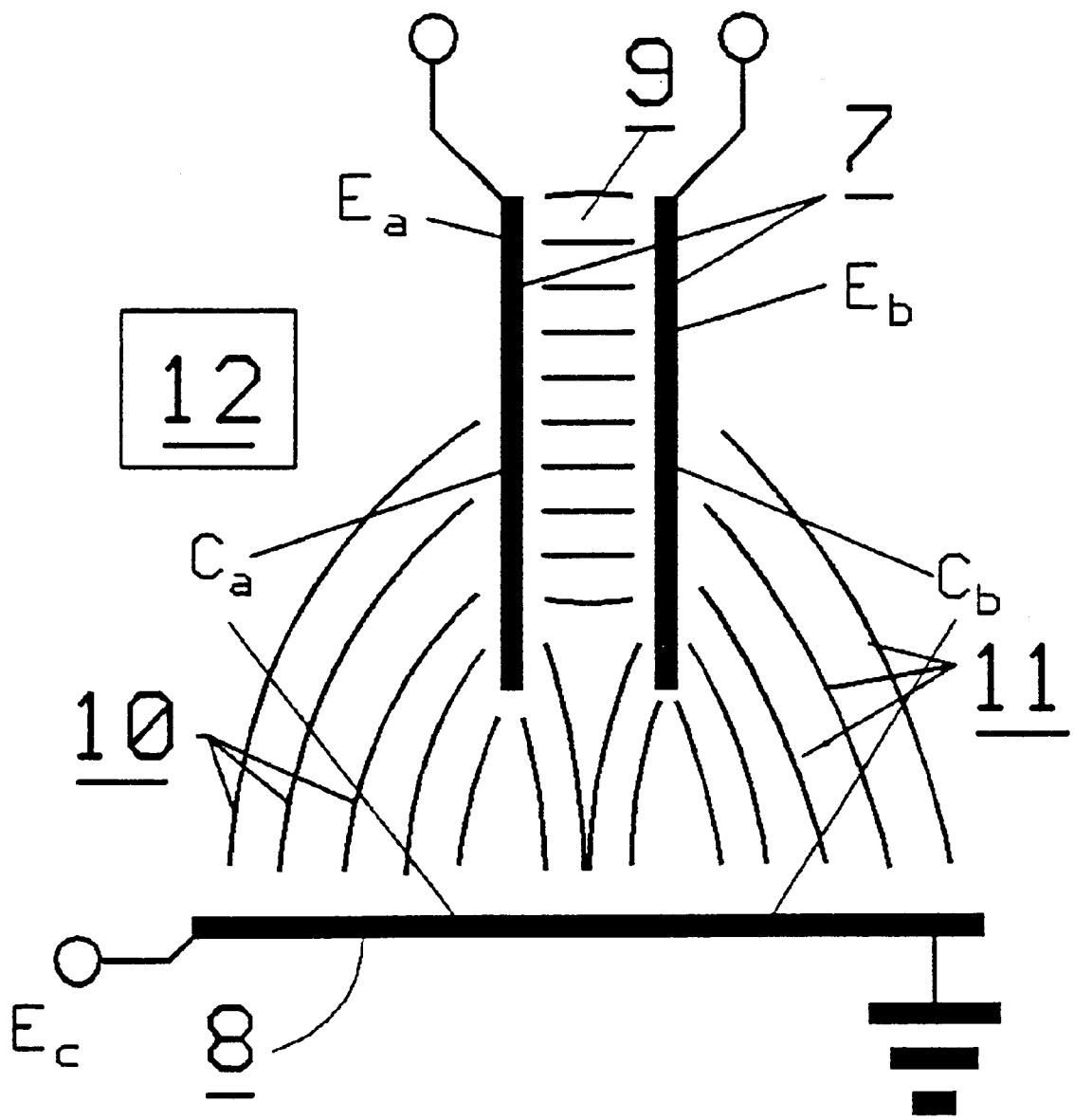
Figure 3:
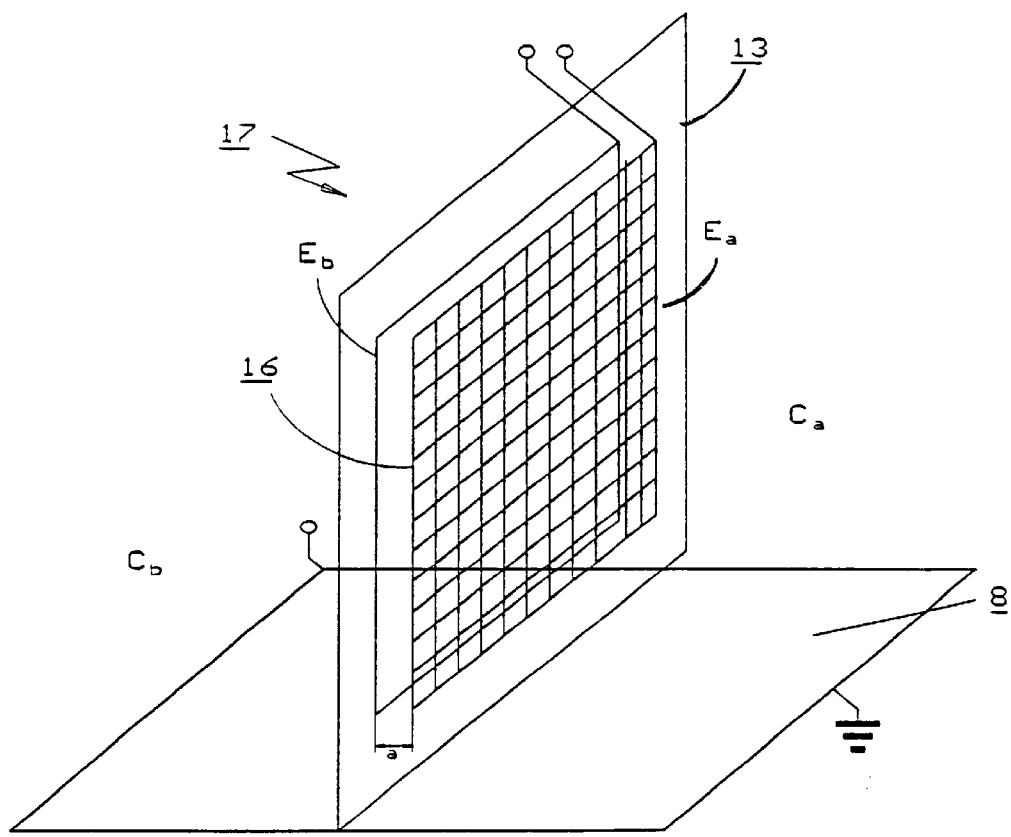
Figure 4:
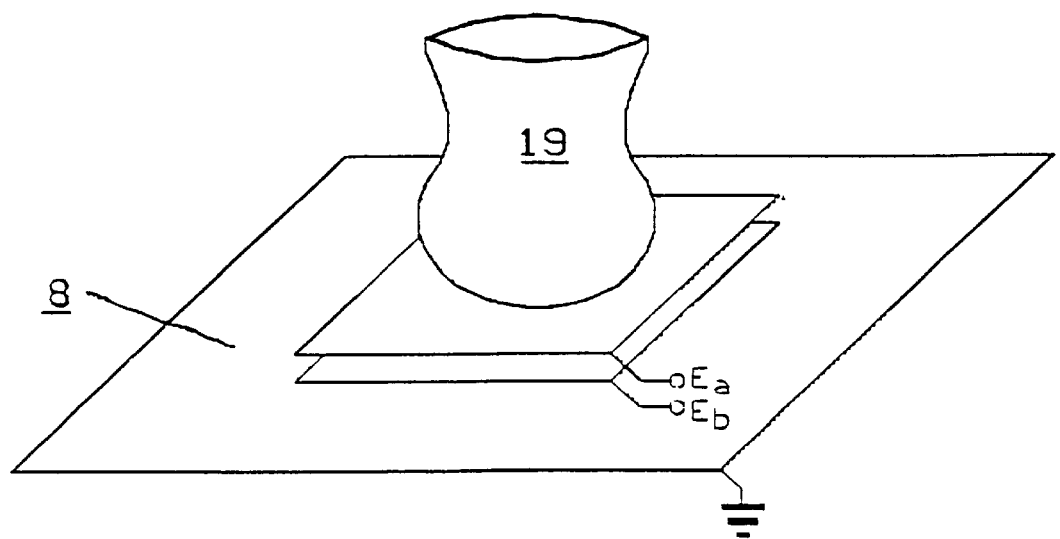
Figure 5:
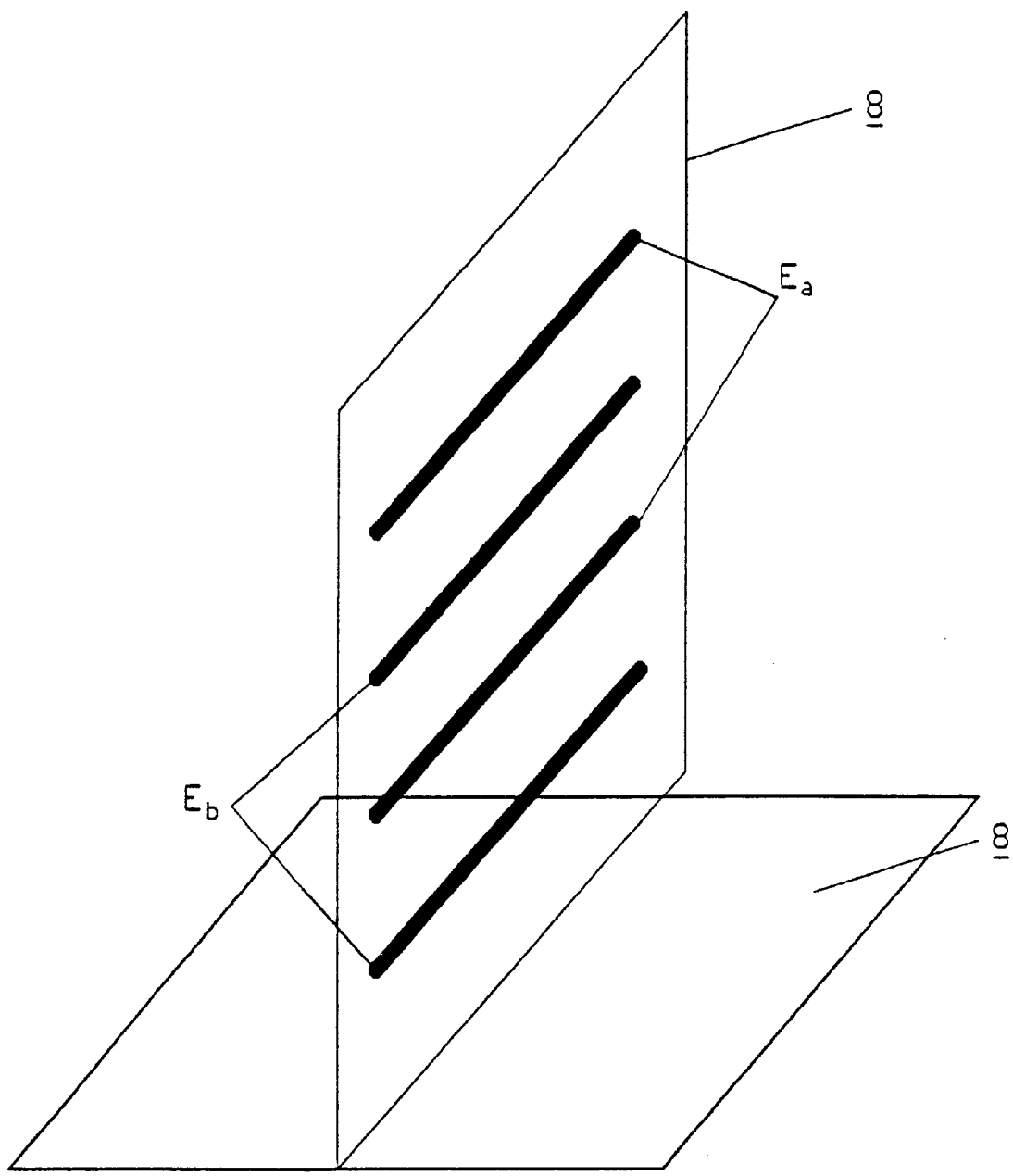

FIG. 1 an electric block diagram of the device with a differential transformer as well as a condenser with a reference electrode, FIG. 2 the representation of the ratios of the electric fields between the condenser and the reference electrode, FIG. 3 a perspective schematic diagram of a grid condenser with a reference electrode, FIG. 4 a sculpture with the device according to the invention for theft protection and FIG. 5 a finger condenser with a reference electrode.

PREFERRED EMBODIMENT OF THE INVENTION

FIG. 1 shows an electric block diagram of the device consisting of a differential transformer 1 with the primary coil La and the secondary coil Lb, which are arranged so as to be wound bifilarly on a shared core 2; moreover, on the core 2, there is a tertiary coil Lc which is preferably capacitively separated from the primary coil and the secondary coil. A signal generator 14, for example, a rectangular-wave generator or a burst generator, is connected to the input 3 of the primary coil La, and said generator feeds a fixed, periodical signal, for example, a rectangular pulse, into the primary coil La at its input 3. A condenser electrode Ea of a condenser 7 is connected to the output 4 of the primary coil La, said condenser consisting of the two condenser electrodes Ea and Eb, which form an electric field 9 between them. One end 6 of the winding of the secondary coil Lb is connected to the second condenser electrode Eb, which constitutes the counter-electrode of the condenser 7. The other end 5 of the secondary coil Lb is connected to a fixed reference potential, preferably here to the system ground 8. The condenser electrode Ea here is the active electrode of the capacitive sensor. The two condenser electrodes Ea and Eb have a small and constant distance from each other and form an electric field 9 between them, FIG. 2.

The two condenser electrodes Ea and Eb are across from a third electrode 8 as the reference electrode, which is preferably the ground and which likewise constitutes a condenser electrode. Therefore, between each of the two condenser electrodes Ea and Eb, and the third reference electrode Ec or 8, ground, an electric stray field is formed, namely, a stray field 10 between the condenser electrode Ea and the electrode Ec or 8 as a result of the stray field capacitance Ca (condenser Ca) as well as a stray field 11 between the condenser electrode Eb and the electrode 8 or Ec as a result of the stray field capacitance Cb (condenser Cb).

As a result of the bifilar winding of the two bifilar coils La, Lb, of the differential transformer 1, the two currents are subtracted with respect to each other when the device is at rest, so that very little or no differential voltage is induced in the tertiary coil Lc. The two condenser electrodes Ea, Eb, together with the reference electrode 8, constitute the actual capacitance-detecting capacitance sensor.

The strongest electric field, field 9, is formed between the condenser electrodes Ea and Eb; this electric field 9 is only insignificantly changed in case of an interference. In contrast, however, if the ratio of the electric stray fields 10, 11 (condensers Ca, Cb) between the two condenser electrodes Ea, Eb and the third reference electrode 8 changes, for example, due to an object 12 approaching or moving away from the condenser electrodes Ea, Eb, then the capacitance ratios change. Here, a change in the capacitance of the active condenser electrode Ea, which is connected to the primary coil, relative to the capacitance Ca, namely, reference electrode 8-condenser electrode Ea, brings about a change in the electric stray field 10, which causes a change in the current in the primary coil La. In contrast, the current in the secondary coil Lb remains practically unchanged because the electric stray field 11 between the condenser electrode Eb and the reference electrode 8 is only changed insignificantly. This brings about a change in the currents of the primary and secondary coils La, Lb, that are subtracted with respect to each other, said change in the tertiary coil Lc causing the induction of a relatively large differential voltage Udiff—corresponding to the winding ratios—which can be displayed and evaluated in a display and measuring device 15 that is connected to the tertiary coil Lc.

In a perspective representation, FIG. 3 shows the principle of a grid condenser 17 with the reference electrode 8, preferably the ground, whereby the grid condenser 17, in turn, consists of the two condenser electrodes Ea and Eb, between which a dielectric 13 is arranged and which are at a distance a from each other. Here, the condenser electrode is configured as a grid 16 and it represents the active condenser electrode Ca, whereby the condenser electrodes Ea, Eb are arranged perpendicular to the reference electrode 8. In this manner, a homogeneous electric field is attained over the entire surface of the sensor, so that a lobe-shaped electric field is avoided, which would not be suitable for monitoring, for example, a picture or a sculpture.

With this embodiment of the active electrode Ea, however, yet another advantage is achieved, namely, when a liquid is sprayed or poured onto the grid 16, as described above, the capacitance Ca between the grid electrode 16 and the reference electrode 8 changes, which, in turn, brings about a voltage change Udiff in the tertiary coil Lc. This voltage change Udiff can then be evaluated. Likewise, the condenser electrode Ea, the active electrode, which is connected to the primary coil La, can have a surface that is provided with interruptions and does not have a full surface or it can be a grid or net 16 or else it can consist of cohesive strips.

FIG. 4 shows a sculpture 19 with the device according to the invention for theft protection of the sculpture. A sculpture in the form of a vase 19 stands on the capacitive sensor, made up of the active condenser electrode Ea, which is separated from the condenser electrode Eb, in this case situated underneath. This condenser 7 is connected to the reference electrode 8, which is preferably the ground 8. In this manner, an electric stray field forms around the vase 19, consisting of an overlapping of the two stray fields 10 and 11 of FIG. 2. A change in these electric stray fields caused by external influences such as, for example, touching with the hands, in turn, brings about an output voltage in the tertiary coil Lc of the differential transformer 1.

FIG. 5 shows an embodiment of a finger condenser with the reference electrode 8. Between each two fingers, which constitute the electrode Ea, there are two additional fingers, which constitute the electrode Eb.

COMMERCIAL APPLICABILITY

The device according to the invention is suited for the detection of minute to small capacitance differences that can lie in the nF to fF range, and their conversion into a voltage change that can be evaluated. In particular, the device is suited to secure windows, doors, passages, safes and rooms in general, as well as objects such as pictures, sculptures and showcases, against removal or theft or destruction. Moreover, the invention can be used for distance measurement or distance monitoring, for level monitoring, for monitoring the occupation of shelves as well as for the occupation of spaces with vehicles. In particular, the space occupation for vehicles in parking garages is an important area of application.

What is claimed is:

1. An electric sensor for measuring a capacitance change of a condenser (7) and conversion into a voltage signal (Udiff) that corresponds to the capacitance change and that is transmitted to a display or measuring device (15) and evaluated, using a transformer (1) with two bifilarly wound coils (La, Lb) on a core (2), whereby a signal generator (14) is connected to the input of the primary coil (La), especially for reporting a distance change of an object (12, 19) to be detected or to be monitored or to report the movement of two objects (12, 19) moving relative to each other, characterized by the following features:
   a) each one of the two condenser electrodes (Ea, Eb) of the condenser (7) is connected to the outputs (4, 6) of the primary (La) and secondary (Lb) coils, whereby said electrodes form an electric field (9) between them and there is a shared reference electrode (8, Ec) across from them which, for each of the condenser electrodes (Ea, Eb), additionally forms an electric stray field (10, 11), so that each condenser electrode (Ea, Eb) yields a stray field condenser (Ca, Cb) with the reference electrode (8, Ec),
   b) the input (5) of the secondary coil (Lb) is connected to a fixed system reference potential (8),
   c) on the core (2) of the transformer (1), there is a tertiary coil (Lc) to which the display or measuring device (15) is connected,
   d) an object approaching the condenser electrodes (Ea, Eb) and the reference electrode (8, Ec) brings about a change in the capacitance of the stray field condensers (Ca, Cb) relative to the reference electrode (Ec, 8), whereby this capacitance change generates a differential mode voltage (Udiff) in the tertiary coil (Lc) and this voltage is evaluated in the display or measuring device (15).

2. The sensor according to claim 1, characterized in that the transformer is a differential transformer (1) and the reference electrode is the ground (8) and the input (5) of the secondary coil (Lb) is connected to the system ground (18).

3. The sensor according to claim 1, characterized in that the signal generator (14) is an oscillator or a pulse generator with a fixed working point, namely, in terms of amplitude and/or frequency and/or signal shape, for example, a rectangular-wave generator or a burst generator.

4. The sensor according to claim 3, characterized in that the working point of the signal generator (14), in terms of amplitude and/or frequency and/or signal shape, is fixedly predefined.

5. The sensor according to claim 1, characterized in that the condenser electrode (Ea) (active electrode), which is connected to the primary coil (La), has a structure that is provided with interruptions and that does not have a full surface.

6. The sensor according to claim 5, characterized in that the condenser electrode (Ea) (active electrode), which is connected to the primary coil (La), can be a grid or a net 16 or else it can consist of cohesive strips.

7. The sensor according to claim 1, characterized in that the winding ratio of the primary coil to the secondary coil is preferably 1 to 1 or is adapted to the size ratio of the electrodes with respect to each other.

8. The sensor according to claim 7, characterized in that the winding ratio of the tertiary coil (Lc) to the primary or secondary coil (La, Lb) is preferably between 1 and 2000 to 1.

9. The sensor according to claim 1, characterized in that the display or measuring device (15) has an optical or acoustic display element.

10. The sensor according to claim 1, characterized in that the two condenser electrodes (Ea, Eb) are arranged as flat electrodes that lie or stand opposite from each other and they can be slanted at a prescribed angle, preferably 90 degrees, with respect to the reference electrode (Ec, 8), preferably the ground.

11. The sensor according to claim 1, characterized in that the tertiary coil (Lc) is capacitively separated from the primary coil and the secondary coil (La, Lb).

12. The use of the electric sensor according to claim 1 as a safety means to protect an object against theft or destruction or to report the presence or the absence of an object (19), such as a picture or a sculpture or a vehicle in a parking spot, whereby the condenser electrode (Ea), which is connected to the primary coil, is placed behind the picture or under the sculpture (19) or else behind or under the vehicle so that, when a person or an object (12) approaches the picture or the sculpture (19) or the parking spot and comes closer than a predefined safety distance, the change in the stray field (10) between the ground (8) and the active electrode (Ea), which is detected by the capacitive sensor, brings about a voltage change (Udiff) in the tertiary coil (Lc) that can be evaluated in the display or measuring device (15).

13. The safety means according to claim 12, characterized in that a carrier representing a dielectric is situated in the area of a vehicle parking spot, the active condenser electrode (Ea) is arranged on the side facing the vehicle and the second condenser electrode (Eb) is situated on the opposite side of the carrier, whereby the load-bearing surface for the vehicle is the reference electrode, namely, the ground (8).

14. A sensor or safety means according to claim 1, characterized in that a plurality of capacitive sensor electrodes, each consisting of the two condenser electrodes as well as the reference electrode, can be actuated by means of a multiplexer and can then be evaluated consecutively.

* * * * *